(Model.)

W. J. KAYSER.
FLY TRAP.

No. 431,361. Patented July 1, 1890.

Witnesses
Geo. W. Young
Wm. K. Cling

Inventor
William J. Kayser
By Stout & Underwood
Attorneys

UNITED STATES PATENT OFFICE.

WILLIAM J. KAYSER, OF MILWAUKEE, WISCONSIN, ASSIGNOR OF TWO-THIRDS TO ISIDOR LEISER AND WILLIAM GEUDER, BOTH OF SAME PLACE.

FLY-TRAP.

SPECIFICATION forming part of Letters Patent No. 431,361, dated July 1, 1890.

Application filed August 19, 1889. Serial No. 321,243. (Model.)

*To all whom it may concern:*

Be it known that I, WILLIAM J. KAYSER, of Milwaukee, in the county of Milwaukee, and in the State of Wisconsin, have invented certain new and useful Improvements in Fly-Traps; and I do hereby declare that the following is a full, clear, and exact description thereof.

My invention relates to fly-traps, and will be fully described hereinafter.

Figure 1:
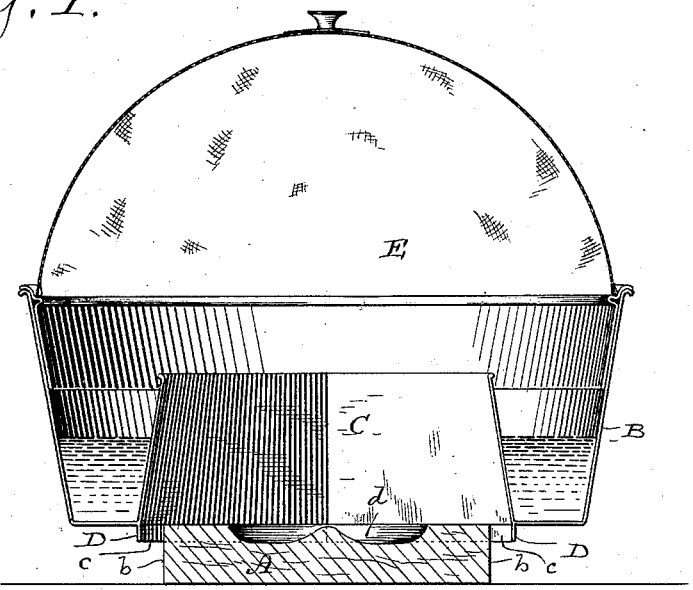
Figure 2:
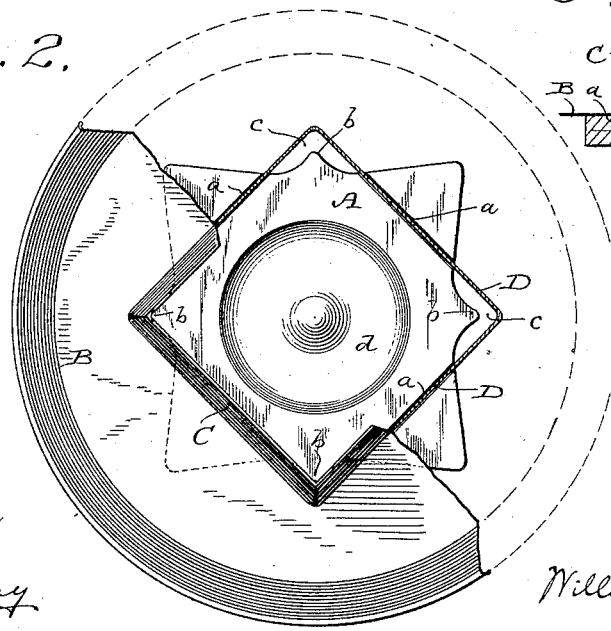

In the drawings, Figure 1 is a central vertical section of my device. Fig. 2 is a broken plan view, and Fig. 3 a detail section of another form of my device.

A is the base-block of my improved trap, and is made from wood or other suitable material in any desirable shape, the one shown being rectangular and having the upper face thereof grooved across its corners at $a$ and the sides provided with ribs or projections $b$.

B is a receptacle formed with an angular well C, the latter having its walls extended down below the bottom of the receptacle to form a flange D, that fits into the grooves $a$ in the base-block A, while each angle of the flange incloses one of the ribs or projections $b$ on said base-block, to leave spaces $c$, that serve as entrances for flies, the latter being attracted by the light from above.

If found desirable, sugar, molasses, or other suitable bait may be placed in the depression $d$ in the base-block as a further attraction for the flies.

When the device is in use, the receptacle B is provided with a gauze or other transparent cover E, and said receptacle may be partly filled with a suitable liquid. The flies, after passing through the spaces $c$, naturally fly upward and, striking the cover E, fall back into the fluid, where they drown.

Figure 3:
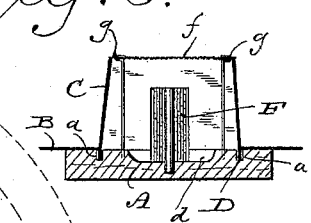

In Fig. 3 I show a roll F of poisoned paper, cloth, or other suitable material secured to the base-block A, and over this roll of poisoned material is suspended a gauze plate $f$, between the edges of which and the sides of the well C a space $g$ is left for the flies to ascend after being stupefied by the poison, the supports for the gauze plate being wire posts, as shown, or any other suitable means. On passing out of the space $g$ the flies will fall back and collect in the receptacle B.

I prefer to artificially illuminate the interior of the trap and the entrances $c$ thereto, in order that flies may be attracted at night or at such times as said trap may be set in darkened apartments. The most convenient and economical means for attaining the desired illumination is to treat the base-board A with phosphorescent paint.

Having thus described my invention, what I claim as new, and desire to secure by Letters Patent, is—

1. In a fly-trap, the combination of a receptacle provided with a well extended below the bottom thereof, and a base-block grooved to engage the extended portion of the well, substantially as set forth.

2. In a fly-trap, the combination of a receptacle provided with a well, a base-block arranged to support the receptacle, and a poison-roll arranged within the well, substantially as set forth.

3. In a fly-trap, the combination of a base-block grooved upon its upper face and provided with side ribs, a receptacle having an angular well for engagement with the grooves whereby the ribs are inclosed by the corners of said well, and a transparent cover for the receptacle, substantially as set forth.

4. In a fly-trap, the combination of a receptacle provided with a well, a base-block, and a poison-roll arranged on the base-block to extend up into the well, substantially as set forth.

In testimony that I claim the foregoing I have hereunto set my hand, at Milwaukee, in the county of Milwaukee and State of Wisconsin, in the presence of two witnesses.

WILLIAM J. KAYSER.

Witnesses:
   N. E. OLIPHANT,
   WILLIAM KLUG.